United States Patent
Kesler et al.

(10) Patent No.: US 10,344,863 B2
(45) Date of Patent: Jul. 9, 2019

(54) METAL SEAL FITTING FOR IN-TANK TRANSMISSION OIL COOLER

(71) Applicant: Hanon Systems, Daejeon (KR)

(72) Inventors: Eric Kesler, Northville, MI (US); Patty Flynn, El Paso, TX (US)

(73) Assignee: HANON SYSTEMS, Daejeon (KR)

(*) Notice: Subject to any disclaimer, the term of this patent is extended or adjusted under 35 U.S.C. 154(b) by 66 days.

(21) Appl. No.: 15/690,510

(22) Filed: Aug. 30, 2017

(65) Prior Publication Data
US 2019/0063607 A1    Feb. 28, 2019

(51) Int. Cl.
| | | |
|---|---|---|
| F16J 15/08 | (2006.01) | |
| F28F 9/02 | (2006.01) | |
| F16L 23/032 | (2006.01) | |
| F28D 21/00 | (2006.01) | |

(52) U.S. Cl.
CPC ....... *F16J 15/0806* (2013.01); *F16J 15/0881* (2013.01); *F16L 23/032* (2013.01); *F28F 9/0234* (2013.01); *F28F 9/0248* (2013.01); *F28F 9/0251* (2013.01); *F28F 9/0256* (2013.01); *F28D 2021/0089* (2013.01); *F28D 2021/0094* (2013.01); *F28F 2230/00* (2013.01); *F28F 2275/20* (2013.01)

(58) Field of Classification Search
CPC ... F16J 15/0806; F16J 15/0881; F28F 9/0256; F28F 9/0251; F28F 9/0234; F28F 9/0248; F16L 23/032
USPC .................................................. 285/205, 336
See application file for complete search history.

(56) References Cited

U.S. PATENT DOCUMENTS

| | | | |
|---|---|---|---|
| 6,386,593 B1 * | 5/2002 | Slais .................. | B60H 1/00571 277/609 |
| 9,261,194 B2 | 2/2016 | Kesler et al. | |
| 2003/0080554 A1 * | 5/2003 | Schroeder .............. | F16L 21/08 285/125.1 |
| 2007/0273102 A1 * | 11/2007 | Schroeder ............. | F16J 15/061 277/312 |
| 2011/0210545 A1 * | 9/2011 | Kesler .................... | F16J 15/061 285/336 |

* cited by examiner

*Primary Examiner* — James M Hewitt, II
(74) *Attorney, Agent, or Firm* — Shumaker, Loop & Kendrick, LLP; James D. Miller

(57) ABSTRACT

A seal fitting assembly comprises a first block having a first aperture, a second aperture, and a first annular sealing surface surrounding the first aperture. A second block has a third aperture and a fourth aperture. An insert has a fifth aperture, a second annular sealing surface, and a second threaded portion. A first seal structure is disposed between the first annular sealing surface and the second annular sealing surface. An adapter has a sixth aperture, a surface of the adapter defining the sixth aperture including a third threaded portion configured to engage the second threaded portion of the insert. A second seal structure is disposed between the insert and the adapter. A fastener is received in the second aperture of the first block and the fourth aperture of the second block.

20 Claims, 9 Drawing Sheets

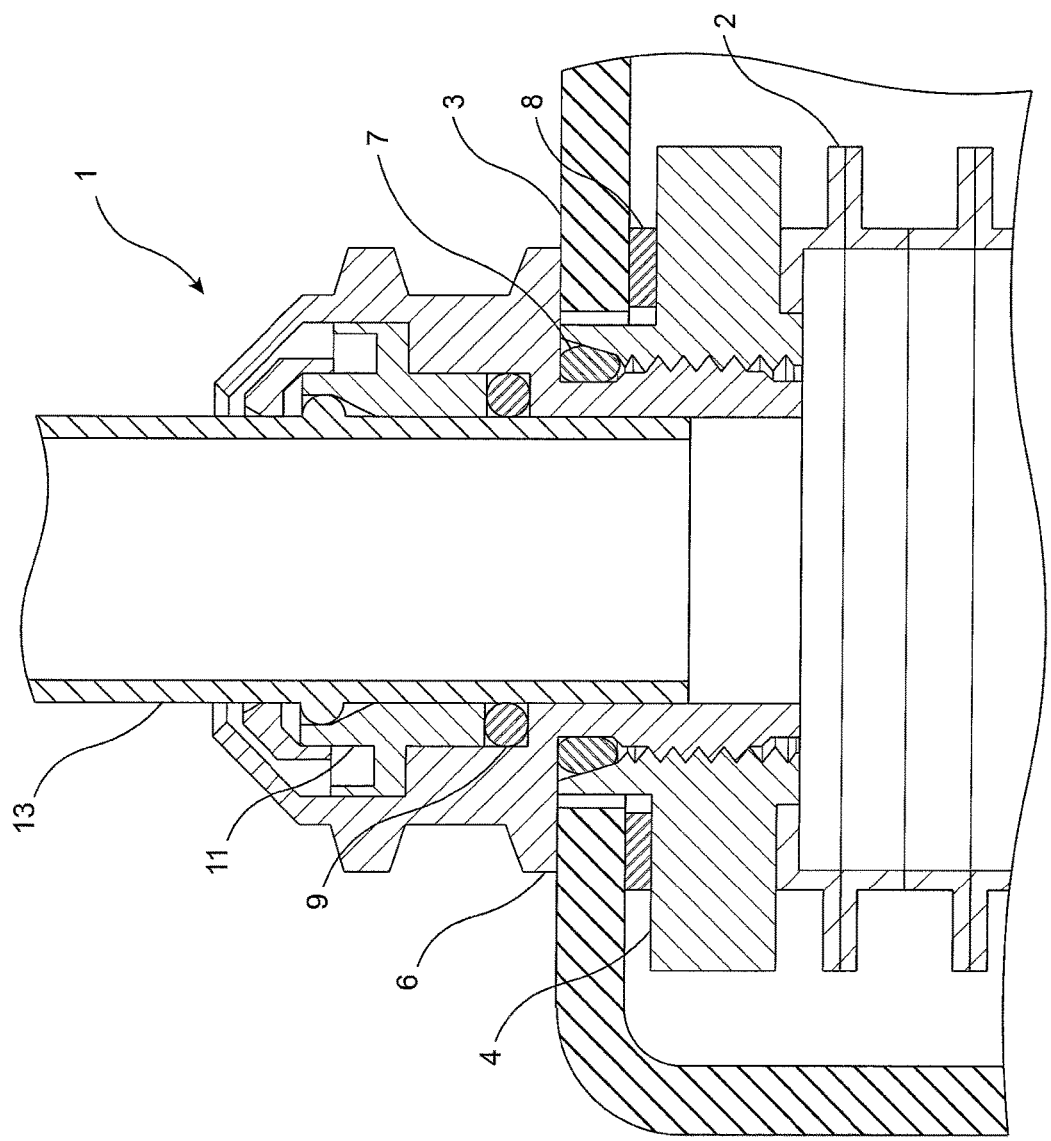
FIG. 1 - PRIOR ART

METAL SEAL FITTING FOR IN-TANK TRANSMISSION OIL COOLER

FIELD OF THE INVENTION

The invention relates generally to an apparatus for connecting fluid lines, and particularly, to an apparatus for connecting high-pressure fluid lines in a cooling system of a motor vehicle.

BACKGROUND OF THE INVENTION

The radiator of a motor vehicle typically includes a pair of manifold tanks in fluid communication with a plurality of heat exchanger tubes extending therebetween. A coolant is caused to flow through the manifold tanks and the heat exchanger tubes to exchange heat energy with a second fluid such as a flow of air. In some circumstances, an additional heat exchanging device may be disposed within one of the manifold tanks for exchanging heat energy between the coolant and a third fluid. The additional heat exchanging device may for example be a transmission oil cooler (TOC) configured to exchange heat energy between the coolant flowing within the manifold tanks and a transmission oil of the motor vehicle.

FIG. 1 illustrates an embodiment of a seal fitting assembly 1 according to the prior art for use with a radiator of a motor vehicle. The seal fitting assembly 1 includes an internal heat exchanger housing 2 acting as a TOC disposed within an outer housing wall 3 of a manifold tank of the radiator. An adapter 4 disposed within the manifold tank includes a first end securely coupled to the internal heat exchanger housing 2 and a second end extending through an opening formed in the outer housing wall 3. An insert 6 includes a threaded portion configured to cooperate with a threaded portion of the adapter 4. As the insert 6 is threaded into the adapter 4, an O-ring 7 is compressed between the adapter 4 and the insert 6 while a gasket 8 is compressed between the adapter 4 and the outer housing wall 3, wherein each of the O-ring 7 and the gasket 8 is formed from an elastomeric material. The seal fitting assembly 1 may include an additional O-ring 9 present between a portion of the insert 6 disposed exterior to the outer housing wall 3, a fluid coupling 11, and a connecting tube 13 received within the insert 6 and the fluid coupling 11. The fluid coupling 11 and connecting tube 13 may be configured to fluidly couple the insert 6 to a source of a fluid configured to circulate through the internal heat exchanger housing 2.

The adapter 4, the insert 6, and the O-ring 7 of the seal fitting assembly 1 according to the prior art are disadvantageously capable of rotating relative to each other as well as the outer housing wall 3 following assembly and during extended use thereof. Such rotation may lead to the O-ring 9 making frictional contact with one of the insert 6, the fluid coupling 11, or the connecting tube 13, thereby subjecting the O-ring 9 to potential wear that could compromise the effectiveness of the seal formed by the O-ring 9. Additionally, rotation of the insert 6 relative to the adapter 4 may cause the insert 6 to partially decouple from the adapter 4, thereby potentially further weakening the seal formed by the cooperation of the adapter 4, the insert 6, the O-ring 7, the O-ring 9, the fluid coupling 11, and the connecting tube 13. The decoupling of the insert 6 from the adapter 4 may further cause the O-ring 7 to make frictional contact with one of the adapter 4 or the insert 6, thereby presenting a potential source of wear experienced by the O-ring 7 that could compromise the effectiveness of the seal formed by the O-ring 7.

One additional issue presented by the seal fitting assembly 1 of the prior art relates to the use of elastomeric seals such as the O-rings 7, 9 disposed between the adapter 4 and the insert 6 as well as between the insert 6, the fluid coupling 11, and the connecting tube 13. Such elastomeric seals are typically vulnerable to contamination as well as manufacturing or assembly difficulties. The elastomeric seals may for example be pinched, torn, or non-uniformly extruded, thereby promoting the formation of irregularities that could lead to flow paths for a fluid to pass by the elastomeric seals.

It would therefore be desirable to form a seal fitting assembly with improved sealing capabilities that further prevents undesirable rotation of components forming the seal fitting assembly.

SUMMARY OF THE INVENTION

Compatible and attuned with the present invention, an improved seal fitting assembly having improved sealing and resistance to rotation has surprisingly been discovered.

In one embodiment of the invention, a seal fitting assembly for use with a housing wall having an opening formed therein comprises a first block having a first aperture, a second aperture, and a first annular sealing surface surrounding the first aperture. A second block has a third aperture and a fourth aperture, a surface of the second block defining the fourth aperture including a first threaded portion. An insert has a fifth aperture, a second annular sealing surface, and a second threaded portion. A first seal structure is disposed between the first annular sealing surface and the second annular sealing surface and is configured for compression therebetween. An adapter has a sixth aperture, a surface of the adapter defining the sixth aperture including a third threaded portion configured to engage the second threaded portion of the insert. A second seal structure is disposed between the insert and the adapter and is configured for compression therebetween. A fastener is received in the second aperture of the first block and the fourth aperture of the second block, the fastener including a fourth threaded portion configured to engage the first threaded portion of the second block.

In another embodiment of the invention, a heat exchanger assembly comprises a heat exchanger tank configured to receive a first fluid and including an outer housing wall having an opening formed therein and a locating feature projecting therefrom, an internal heat exchanger housing disposed within the heat exchanger tank and configured to receive a second fluid fluidly isolated from the first fluid, and a seal fitting assembly. The seal fitting assembly comprises a first block having a first aperture, a second aperture, and a first annular sealing surface surrounding the first aperture. A second block has a third aperture and a fourth aperture, a surface of the second block defining the fourth aperture including a first threaded portion. An insert has a fifth aperture, a second annular sealing surface, and a second threaded portion. A first seal structure is disposed between the first annular sealing surface and the second annular sealing surface and is configured for compression therebetween. An adapter has a sixth aperture, a surface of the adapter defining the sixth aperture including a third threaded portion configured to engage the second threaded portion of the insert. A second seal structure is disposed between the insert and the adapter and is configured for compression therebetween. A fastener is received in the second aperture of the first block and the fourth aperture of the second block, the fastener including a fourth threaded portion configured to engage the first threaded portion of the second block.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawings of which:

FIG. 1 is a fragmentary cross-sectional elevational view of a seal fitting assembly according to the prior art;

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 4:
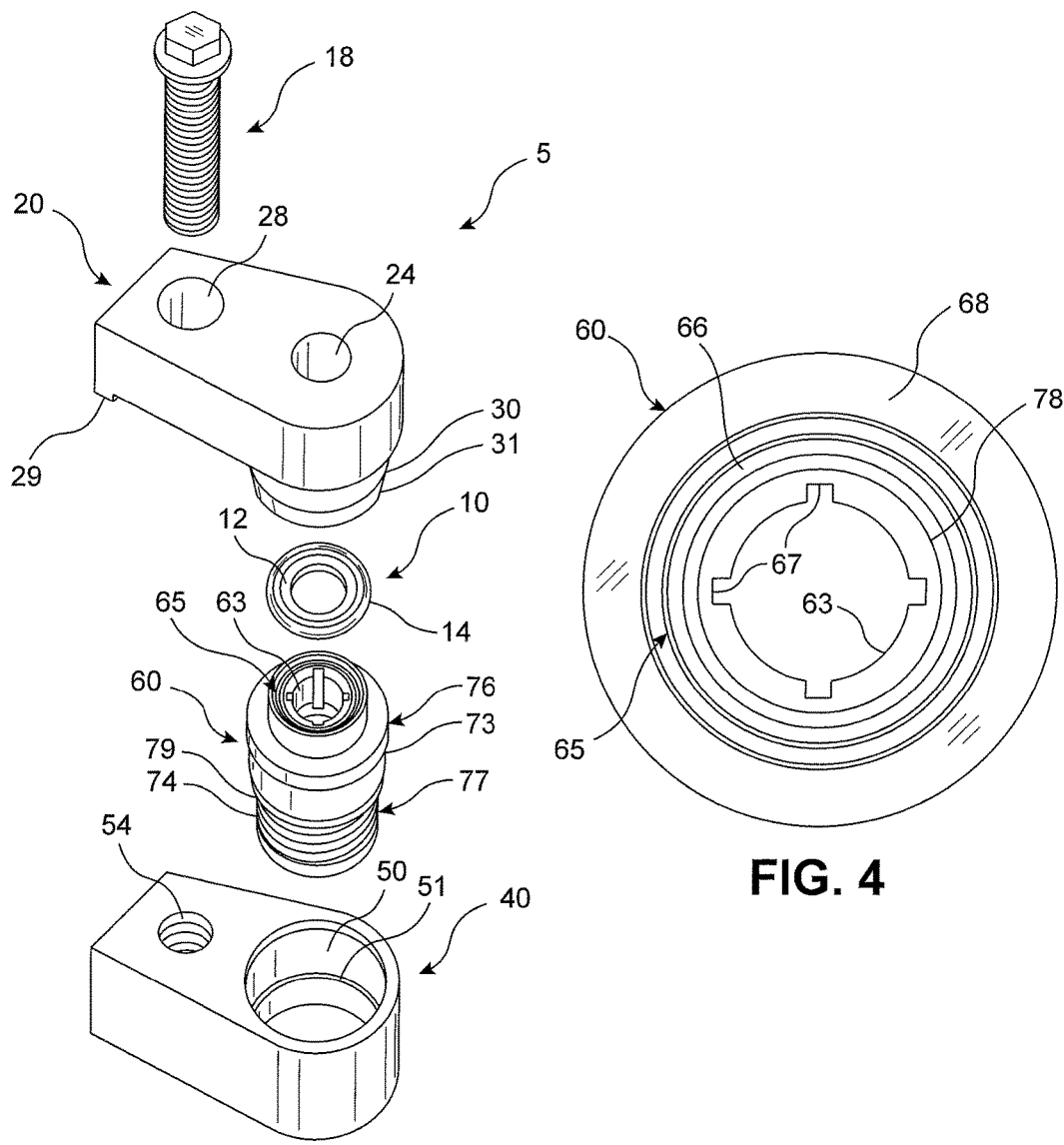
FIG. 4 is a top plan view of an insert of the seal fitting assembly of FIG. 2.
Figure 2:
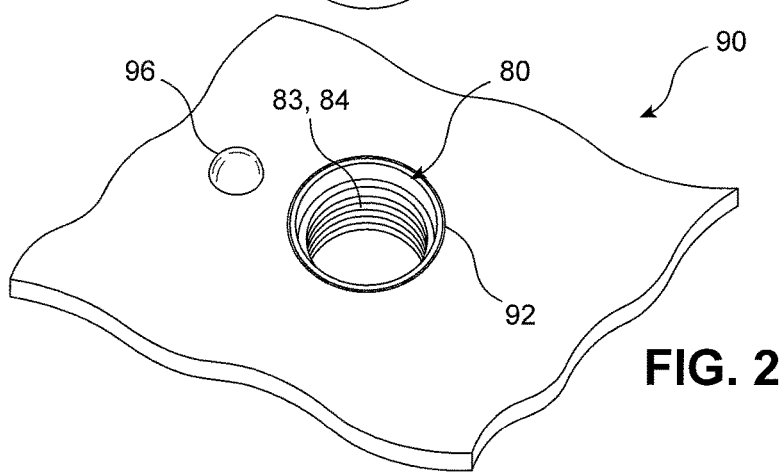
FIG. 2 is an exploded perspective view of a seal fitting assembly according to an embodiment of the invention.
Figure 3:
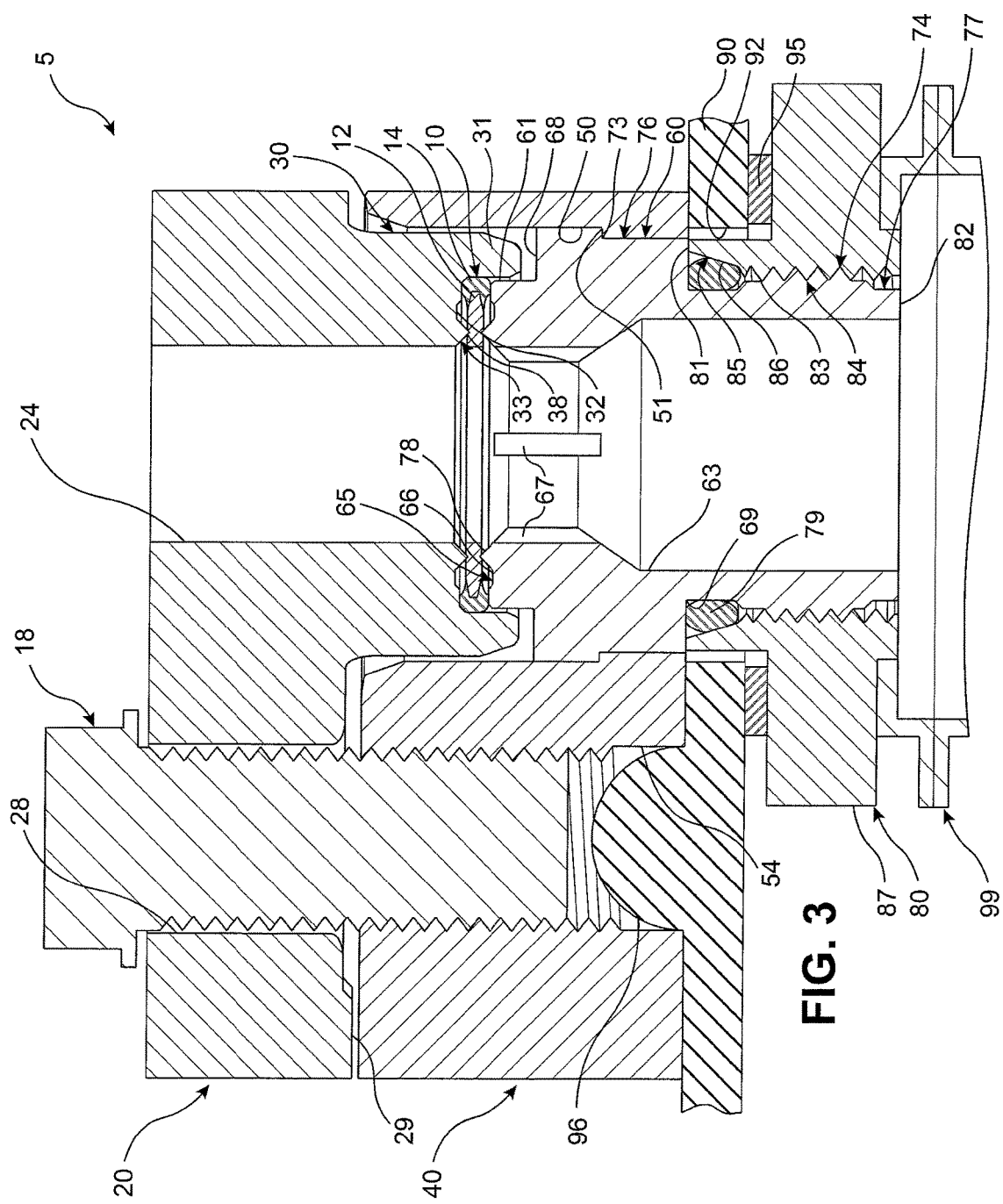
FIG. 3 is fragmentary cross-sectional elevational view of the seal fitting assembly of FIG. 2.

FIGS. 2-4 illustrate a seal fitting assembly 5 according to an embodiment of the invention. The seal fitting assembly 5 includes a seal structure 10, a first block 20, a second block 40, an insert 60, and an adapter 80. The seal fitting assembly 5 is configured to form a fluid tight seal between associated components formed to opposing sides of a housing wall 90. The housing wall 90 may form an outermost surface of a manifold tank of a heat exchanger for use in a motor vehicle, for example. The heat exchanger may be a radiator having a manifold tank configured to receive a first heat exchanging fluid. The first fluid may be a coolant associated with transferring heat energy with the engine of the motor vehicle.

A secondary heat exchanger housing 99 is disposed within the manifold tank and is securely coupled to the adapter 80. The secondary heat exchanger housing 99 forms a flow path configured to receive a second fluid. The second fluid is configured to exchange heat energy with the first fluid flowing through the manifold tank while remaining fluidly isolated therefrom. The secondary heat exchanger housing 99 may for example represent a transmission oil cooler disposed within the manifold tank of the radiator and the second fluid may be transmission oil originating from a transmission system of the motor vehicle, as one non-limiting example. Only an inlet or outlet portion of the secondary heat exchanger housing 99 is shown, as the structure of the secondary heat exchanger housing 99 does not affect a manner of operation of the seal fitting assembly 5. The secondary heat exchanger housing 99 may be formed for a single tank or may be formed by the cooperation of a plurality of plate-like structures, as desired. However, it should be understood that the adapter 80 may be in fluid communication with any form of fluid conveying component or structure disposed in the interior of the housing wall 90 without departing from the scope of the present invention.

The seal structure 10 includes a first seal portion 12 and a second seal portion 14. The first seal portion 12 is a substantially flat annular ring. An outer peripheral edge of the first seal portion 12 includes a chamfer formed thereon. The chamfer provides additional surface area for bonding between the first seal portion 12 and the second seal portion 14 and also permits the first seal portion 12 to be disposed further inside of the second seal portion 14 without displacing an undesirable amount of the material forming the second seal portion 14 for purposes of compression. The cross-sectional shape of the first seal portion 12 is substantially rectangular, although other cross-sectional shapes can be used as desired such as triangular, oval, and other radial curves, for example.

In the embodiment shown, the first seal portion 12 is produced from a tin-coated copper that has been annealed in a non-hydrogen containing inert gas prior to plating with tin in order to avoid embrittlement. However, it is understood that other conventional materials can be used as desired such as laminated tetrafluoroethylene, rubber-coated aluminum, PEEK, Vespel® high performance polyimide polymer, pewter, babbit, bronze, nickel, polyamide, aluminum, and other metal coated or rubber-coated metals, for example. In a particular embodiment, the first seal portion 12 is formed from a soft deformable material having a hardness of less than about 40 HR 15T, where "H" stands for hardness, and "R" stands for the Rockwell Hardness and Rockwell Superficial Hardness Test Methods for Metallic Materials as specified in ASTM E 18. The hardness designation code "15T" is a superficial hardness scale which uses a 15 kg load and a 1/16" diameter hardened steel ball for indentation of a test sample. Typical washer materials such as hardened steel and hardened aluminum have hardness values greater than 40 HR15T, and are therefore not considered in the art to be "soft" materials. One of ordinary skill in the art should understand that materials having a hardness greater than 40 HR15T are not suitable for use in the seal structure 10 of the invention, which is instead configured to be plastically deformed upon installation of the seal structure 10 under a force, for example, from about 500 lbf/inch to about 1000 lbf/inch of sealing bead circumference, which is applied to sealingly engage the seal structure 10.

The second seal portion 14 extends radially outwardly from the outer peripheral edge of the first seal portion 12. An annular channel is formed in a radial inner portion of the second seal portion 14 to receive the chamfer of the first seal portion 12. The second seal portion 14 is fastened to the first seal portion 12 by any conventional fastening means such as vulcanizing, heat welding, press fitting, an adhesive, or a mechanical means of attachment, for example. In the embodiment shown, the second seal portion 14 is produced from an elastomer. It is understood that the second seal portion 14 may be produced from any conventional material such as an ethylene propylene diene monomer (EPDM), fluorocarbon rubber (FKM), chloroprene rubber (CR), acrylonitrile butadiene rubber (NBR), and hydrogenated acrylonitrile butadiene rubber (HNBR), for example.

The first block 20 includes a first aperture 24 having a generally circular cross-section configured to receive a flow of the second fluid and a second aperture 28 having a generally circular cross-section configured to receive a fastener 18. The first aperture 24 may be in fluid communication with a conduit (not shown) conveying the second fluid. The conduit may be received in at least a portion of the first aperture 24 and may be securely coupled to the first block 20 by any known method, such as brazing. Alternatively, the first block 20 may form an integrally formed extension of a component conveying the second fluid therethrough. One skilled in the art should appreciate that the first block 20 may have any suitable structure for fluidly coupling the first aperture 24 to a source of the second fluid, as desired, without departing from the scope of the present invention.

An annular boss 30 extends outwardly from a face of the first block 20 and includes an axially extending lip 31 projecting from a distal end thereof. The lip 31 surrounds an annular surface 33 acting as a sealing surface configured to engage the sealing structure 10. An annular channel 32 is formed in the annular surface 33. In the embodiment shown, the channel 32 is substantially V-shaped or trapezoidal in cross-section. However, it is understood that channels 32 having other shapes can be used as desired.

Figure 5:
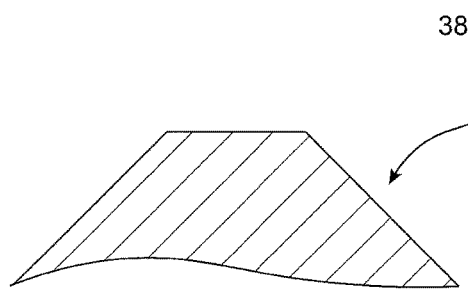
FIGS. 5-10 illustrate various cross-sectional configurations of a sealing bead of the seal fitting assembly of FIGS. 2-4.
Figure 6:
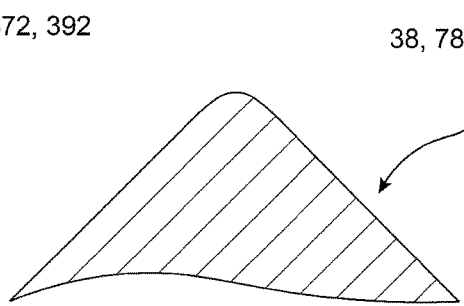
Figure 7:
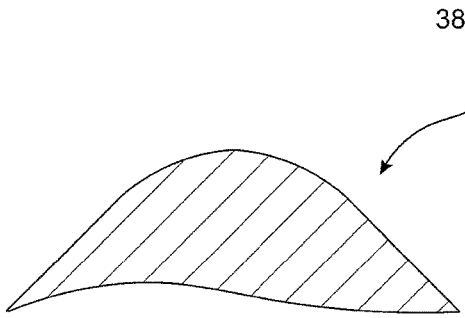
Figure 8:
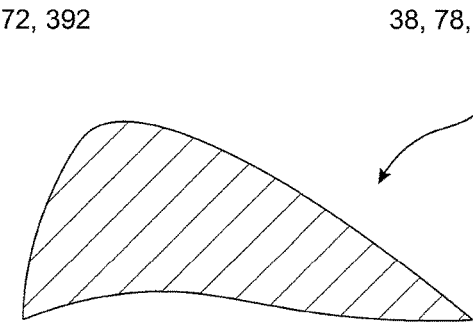
Figure 9:
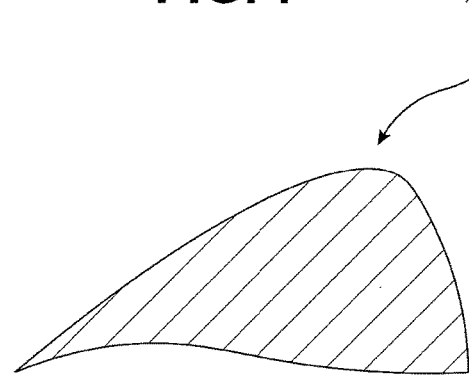
Figure 10:
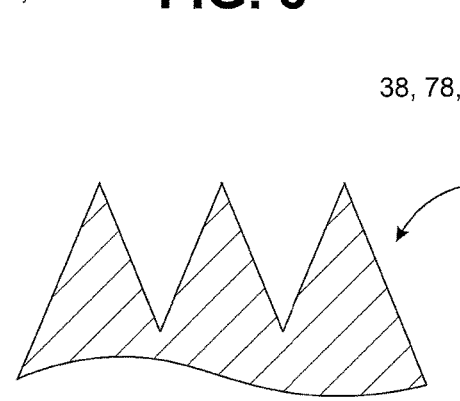

A sealing bead 38 is formed on the annular surface 33 of the first block 20 at a position radially inward of the channel 32. Although the sealing bead 38 shown has a V-shaped cross-section, other shapes can be used. For example, FIGS. 5-10 illustrate various configurations of the sealing bead 38 having different cross-sectional shapes. FIG. 5 illustrates the sealing bead 38 as having a substantially trapezoidal cross-sectional shape to minimize the localized stress distributed to a distal end of the sealing bead 38. FIG. 6 illustrates the sealing bead 38 as having a curved distal end having a relatively small radius of curvature while FIG. 7 illustrates the sealing bead 38 as having a curved distal end having a relatively large radius of curvature. FIGS. 8 and 9 illustrate the sealing bead 38 as having oblique cross-sectional shapes wherein one of the inwardly tapering surfaces is inclined at a different angle in comparison to the other of the inwardly tapering surfaces. The sealing beads 38 are shown as having radiused distal ends in FIGS. 8 and 9, but it should be further understood that sharper or pointed type edges similar to that disclosed in FIGS. 2-4 may be used, as desired. FIG. 10 illustrates a configuration wherein the sealing bead 38 includes a plurality of tapered projections formed immediately adjacent each other in a saw-tooth configuration. One skilled in the art should appreciate that alternative configurations of the sealing bead 38 may be used without departing from the scope of the present invention.

In particularly illustrative embodiments, the sealing bead 38 includes a tip that is substantially V-shaped with a sharp angle. The sealing bead 38 may be formed to be sufficiently sharp to cut through contamination such as oil, dirt, hair, paint flakes, and other debris that may undesirably be present at the first seal portion 12 of the seal structure 10. As a non-limiting example, a maximum radius of the tip of the sealing bead 38 is sufficient to cut through the contamination and impinge the first seal portion 12 may be up to about 0.1 mm. Other radii for the tip of the sealing bead 38 sufficient to cut through the contamination and impinge the first seal portion 12 may also be employed. Only one sealing bead 38 is shown, however, a plurality of sealing beads 38 can be used if desired, resulting in concentric rings.

The first block 20 further includes a leverage feature 29 formed at a side of the second aperture 28 opposite the boss 30. The leverage feature 29 extends from a substantially planar face of the first block 20 in facing relationship with the second block 40. The leverage feature 29 may have a substantially heel-like structure or appearance as the leverage feature 29 extends away from the face of the first block 20, as desired.

The second block 40 includes a first aperture 50 having a generally circular cross-section configured to receive the insert 60 and a second aperture 54 having a generally circular cross-section configured to receive the fastener 18. The first aperture 50 includes an annular shoulder 51 therein for establishing an axial position of the insert 60 relative to the second block 40. The second aperture 54 of the second block 40 may be threaded for cooperation with a threaded portion of the fastener 18. A skilled artisan should understand that other suitable types of fasteners may also be used within the scope of the present disclosure. Additionally, the fastener 18 may alternatively be replaced with any form of mechanism suitable for providing a clamping force for pressing the first block 20 in a direction towards the second block 40, as desired.

The leverage feature 29 has been shown and described as being formed on the first block 20, but one skilled in the art should appreciate that the leverage feature may alternatively project from the second block 40 in a direction towards the first block 20 without affecting a manner of operation of the seal fitting assembly 5, as desired.

The first block 20 and the second block 40 may be formed from any material providing sufficient corrosion resistance under coolant system operating conditions. For example, the blocks 20, 40 may be formed by either extruding or die casting a metal such as aluminum or steel, or a metal alloy such as an aluminum alloy. In a particular example, the blocks 20, 40 are die cast from an aluminum alloy suitable for die casting. An exemplary aluminum alloy for die casting has up to about 0.6 percent copper, in order to provide the desired corrosion resistance. In a further example, the blocks 20, 40 are anodized to minimize corrosion during operation thereof. Other suitable materials and treatments for enhancing corrosion resistance may be employed, as desired.

The insert 60 extends axially from a first end 61 to a second end 62 thereof with an aperture 63 having a generally circular cross-section extending therethrough. The aperture 63 is shown as having a conical portion of increasing diameter intermediate the first end 61 and the second end 62 of the insert 60, but it is understood that the aperture 63 may have any cross-sectional shape and configuration without departing from the scope of the present invention. The first end 61 of the insert 60 includes an annular surface 65 circumscribing the aperture 63 and acting as a sealing surface for engaging the seal structure 10. An annular indentation 68 surrounds the annular surface 65 and provides a void for receiving the lip 31 of the first block 20. The annular surface 65 includes an annular channel 66 formed therein having a substantially V-shaped or trapezoidal shaped cross-section. It is understood that channels 66 having cross-sectional shapes other than that shown and described may be used without departing from the scope of the present invention.

The annular surface 65 further includes a sealing bead 78 disposed radially inward of the channel 66 and opposing the sealing bead 38 of the first block 20. It should be appreciated that the opposing sealing beads 38, 78 facilitate the formation of the primary seal regardless of the presence of conventional contamination at the first seal portion 12 of the seal structure 10. Like the sealing bead 38 of the first block 20, the sealing bead 78 of the insert 60 may have a tip that is substantially V-shaped with a sharp angle or that is rounded with the small radius of curvature. The sealing bead 78 may for example have any of the shapes disclosed in FIGS. 5-10 with reference to the opposing sealing bead 38 of the first block 20. The sealing bead 78 may be formed sufficiently sharp or pointed so as to cut through contamination such as oil, dirt, hair, and other debris that may undesirably be present at the first seal portion 12 of the seal structure 10. A plurality of sealing beads 78 can also be used, as desired, wherein each of the sealing beads 78 is formed in alignment with a corresponding one of the sealing beads 38.

The insert 60 includes a larger diameter portion 76 adjacent the first end 61 of the insert 60 and a smaller diameter portion 77 adjacent the second end 62 of the insert 60. An outer surface of the larger diameter portion 76 includes an annular shoulder 73. The annular shoulder 73 is configured to abut the annular shoulder 51 of the second block 40 to establish an axial positioning of the insert 60 relative to the second block 40. An outer surface of the smaller diameter portion 77 includes a threaded portion 74 spaced from the larger diameter portion 76.

An interior corner 69 is formed at the intersection of the larger diameter portion 76 and the smaller diameter portion 77 of the insert 60. The interior corner 69 is spaced from the threaded portion 74 and is configured to receive an O-ring 79 therein, the O-ring 79 acting as a sealing structure. The O-ring 79 may have a substantially elliptical or circular cross-sectional shape. In the embodiment shown, the O-ring 79 is produced from an elastomer. It is understood that the O-ring 79 may be produced from any conventional material such as an ethylene propylene diene monomer (EPDM), fluorocarbon rubber (FKM), chloroprene rubber (CR), acrylonitrile butadiene rubber (NBR), and hydrogenated acrylonitrile butadiene rubber (HNBR), for example.

As best shown in FIG. 4, the insert 60 further includes four slots 67 extending axially from the first end 61 of the insert 60 at the intersection of annular surface 65 and the surface of the insert 60 defining the aperture 63. The slots 67 are formed radially inward from the tip of the sealing bead 78 and extend any suitable distance in the axial direction of the insert 60. The slots 67 are configured for receiving a corresponding tool (not shown) having projections corresponding to the shape of the slots 67 to allow for the tool to engage the slots 67 to facilitate rotation of the insert 60. The tool may for example resemble a Phillip's head type screwdriver having four projecting edges. It should be appreciated that the insert 60 may include any number of the slots 67 and the slots 67 may have any suitable cross-sectional shape for engaging a corresponding tool used to rotate the insert 60.

The insert 60 may be formed from any material described as suitable for forming the blocks 20, 40. The insert 60 may for example be formed from aluminum, steel, or a metal alloy such as an aluminum alloy, as desired.

The adapter 80 extends axially from a first end 81 to a second end 82 thereof. An aperture 83 having a generally circular cross-section extends axially through the adapter 80. An inner surface of the adapter 80 defining the aperture 83 includes a threaded portion 84 configured to cooperate with the threaded portion 74 of the insert 60. The first end 81 of the adapter 80 includes an annular collar 85 having a conical surface 86 formed at an angle with respect to the axial direction of the adapter 80. The annular collar 85 includes an outer diameter smaller than an inner diameter of an opening 92 formed in the housing wall 90 configured to receive the collar 85 therein. A flanged portion 87 of the adapter 80 extends radially outwardly beyond the collar 85 and establishes a surface for engaging a gasket 95 received over the collar 85 of the adapter 80. The gasket 95 acts as a sealing structure formed from a substantially deformable elastomer. It is understood that the gasket 95 may be produced from any conventional material such as an ethylene propylene diene monomer (EPDM), fluorocarbon rubber (FKM), chloroprene rubber (CR), acrylonitrile butadiene rubber (NBR), and hydrogenated acrylonitrile butadiene rubber (HNBR), for example. The gasket 95 is shown as having a substantially rectangular cross-sectional shape, but alternative cross-sectional shapes may be used without departing from the scope of the present invention.

With reference to FIGS. 2 and 3, a method of assembling the seal fitting assembly 5 is disclosed. First, the adapter 80 is positioned within an interior of the housing wall 90 wherein the second end 82 of the adapter is mechanically and fluidly coupled to the secondary heat exchanger housing 99 disposed within the housing wall 90. The second end 82 of the adapter 80 may for example be coupled to an inlet or outlet manifold of the heat exchanger housing 99. The first end 81 of the adapter 80 is then brought adjacent the opening 92 formed in the housing wall 90.

Next, the second block 40 is positioned relative to the opening 92 of the housing wall 90 via a locating feature 96 disposed on an outer surface of the housing wall 90. The locating feature 96 may be a projection having a perimeter shape substantially corresponding to a shape of the second aperture 54 of the second block 40. The receiving of the locating feature 96 in the second aperture 54 prevents rotation of the second block 20 relative to the housing wall 90.

Following the locating of the second block 40 relative to the housing wall 90, the first aperture 50 of the second block 40 is substantially aligned with each of the opening 92 formed in the housing wall 90 and the aperture 83 formed in the adapter 80. The insert 60 is then received into the first aperture 50 of the second block 40 until the threaded portion 74 of the smaller diameter portion 77 of the insert 60 engages the threaded portion 84 of the aperture 83 of the adapter 80. An associated tool (not shown) is then used to engage the slots 67 of the insert 60 to cause rotation of the insert 60 relative to the adapter 80, thereby causing the insert 60 to continue to move in the axial direction thereof towards the adapter 80. The insert 60 continues to traverse the threaded portion 84 of the adapter 80 until the shoulder 73 of the insert 60 abuts the shoulder 51 formed within the first aperture 50 of the second block 40. At this point, continued rotation of the insert 60 will tend to draw the adapter 80 axially towards the second block 40 to compress the gasket 95 between the housing wall 90 and the flanged portion 87 of the adapter 80 until a suitable and substantially fluid tight seal is attained therebetween.

During the rotation of the insert 60 relative to the adapter 80, the O-ring 79 disposed about the insert 60 is compressed between the larger diameter portion 76 of the insert 60 and the conical surface 86 of the collar 85. The manner in which the conical surface 86 is angled with respect to each of the axial and radial directions causes the O-ring 79 to be compressed in both of the axial and radial directions as the insert 60 is drawn closer to the adapter 80, thereby promoting a substantially fluid tight seal between the adapter 80 and the insert 60.

The insert 60 and the second block 40 cooperate to form a female component configured to receive a male component in the form of the first block 20. The sealing structure 10 is positioned intermediate the annular surface 65 of the insert 60 and the annular surface 33 of the first block 20 as the boss 30 is received into the first aperture 50 of the second block 40. The lip 31 of the boss 30 extends into the indentation 68 surrounding the annular surface 65 of the insert 60 as the sealing beads 38, 78 abut the first seal portion 12 of the seal structure 10. The fastener 18 is inserted through the second apertures 28, 54 of the blocks 20, 40 and is rotated to cause the first block 20 to be moved towards the second block 40.

FIG. 3 illustrates the seal fitting assembly 5 when the fastener 18 has been rotated to a position wherein the sealing beads 38, 78 are in contact with opposing sides of the sealing structure 10 and prior to engagement of the leverage feature 29 with the second block 40. Continued rotation of the fastener 18 causes the sealing beads 38, 78 to compress and then impinge the first seal portion 12 of the seal structure 10 to form a primary seal. The second seal portion 14 of the seal structure 10 creates a secondary seal with the annular surfaces 33, 65. If an amount of the fluid flowing through the apertures 24, 63 leaks past the primary seal formed by the first seal portion 12 and the sealing beads 38, 78, the second seal portion 14 militates against the leakage of the fluid from the seal fitting assembly 5 to the atmosphere. The second seal portion 14 also serves as an environmental seal keeping harmful contaminants away from the first seal portion 12.

The leverage feature 29 formed on the first block 20 engages the second block 40 and acts as a fulcrum for distributing the clamping force formed between the first and second blocks 20, 40 via the fastener 18 to the annular surfaces 33, 65 of the first block 20 and the insert 60, respectively. Additionally, the inclusion of the leverage feature 29 allows for the fastener 18 to be rotated until a portion of the first block 20 adjacent the aperture 28 is able to flex towards the second block 40 in response to the compression of the first block 10 between the fastener 18 and the second block 40. The overtightening of the fastener 18 promotes continued compression of the seal structure 10 between the first block 20 and the insert 60 in the event that the fastener 18 is undesirably rotated away from the overtightened position due to the leverage feature 29 continuing to act as a fulcrum despite the loosening of the fastener 18. A more thorough explanation of the interaction between a male component and a female component for compressing a metallic seal structure is provided in U.S. Pat. No. 9,261,194 to Kesler et al., which is hereby incorporated herein by reference in its entirety.

The seal fitting assembly 5 provides numerous advantages over the seal fitting assemblies of the prior art. First, the use of the seal structure 10 having each of the first seal portion 12 and the second seal portion 14 provides an improved seal in comparison to the use of a radially or axially compressed elastomeric sealing structure such as an O-ring. The improved seal is caused by the impingement of the sealing beads 38, 78 into the seal structure 10, the flowability of the materials forming the seal structure 10, and the improved compression formed by the inclusion of the leverage feature 29. Second, the manner of assembly of the seal fitting assembly 5 prevents rotation of the seal fitting assembly 5 relative to the housing wall 90 during extended use thereof. The compression and impingement of the seal structure 10 between the first block 20 and the insert 60 fixes a rotational position of the insert 60 relative to the adapter 80 while the reception of the locating feature 96 into the aperture 54 of the second block 40 fixes a rotational position of the first and second blocks 20, 40. As a result, the insert 60 is not able to rotate relative to the adapter 80 or the O-ring 79 disposed therebetween, thereby preventing damage or wear to the O-ring 79 that may otherwise be caused by free rotation of the components of the seal fitting assembly 5 relative to each other or relative to the housing wall 90.

Figure 11:
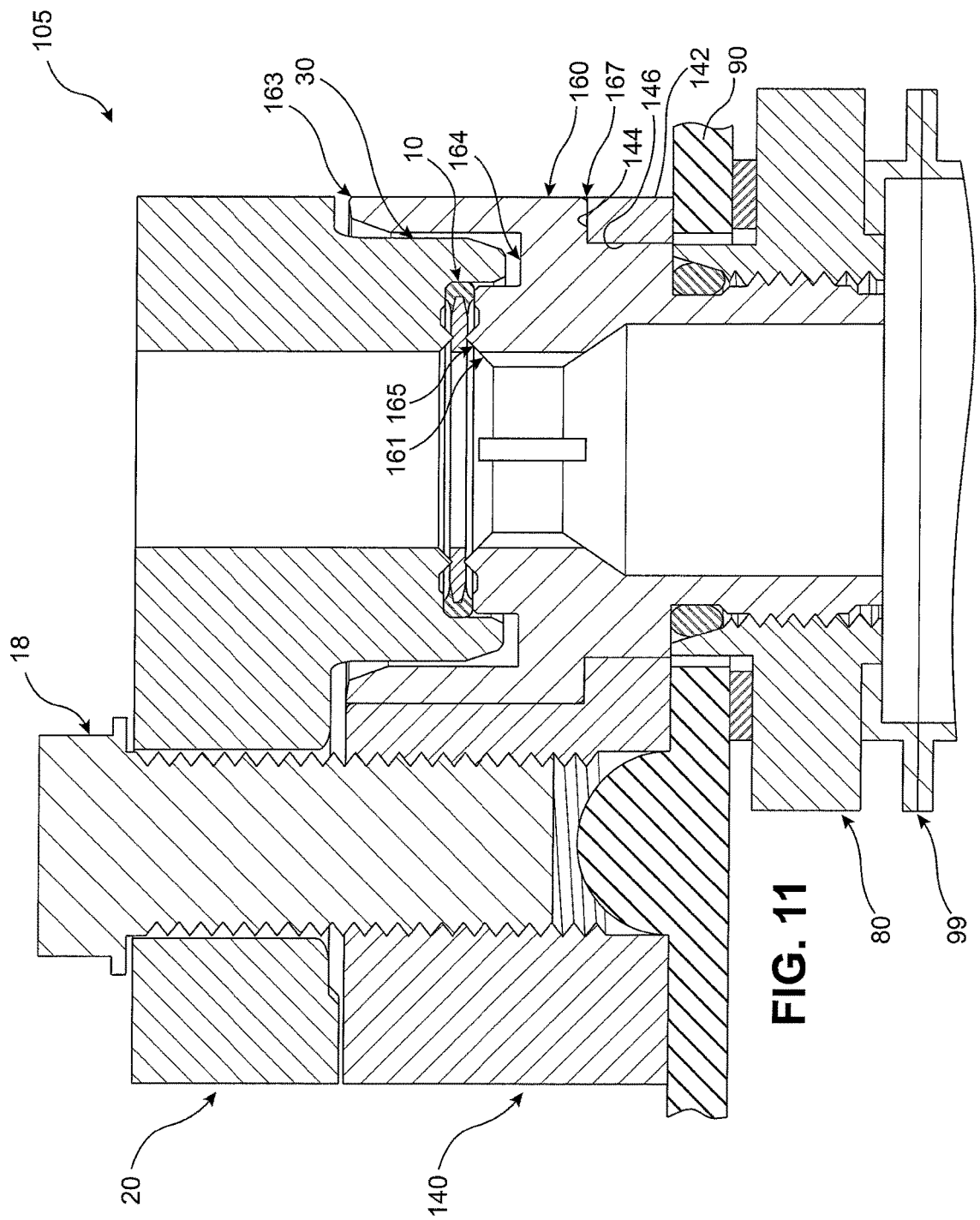
FIG. 11 is a fragmentary cross-sectional elevational view of a seal fitting assembly according to another embodiment of the invention.

Referring now to FIG. 11, a seal fitting assembly 105 according to another embodiment of the invention is disclosed. The seal fitting assembly 105 includes a second block 140 and an insert 160 modified in comparison to the second block 40 and the insert 60 of the seal fitting assembly 5 disclosed in FIGS. 2-4, but the remainder of the seal fitting assembly 105 including the fastener 18, the first block 20, the adapter 80, and the housing wall 90 remain unchanged and operate in the same manner as disclosed hereinabove. The insert 160 is substantially similar to the insert 60 except for the addition of an annular collar 163 extending axially from a perimeter of a first end 161 thereof. The collar 163 is dimensioned to receive the boss 30 of the first block 20 therein when the first block 20 is drawn towards the second block 140. The insert 160 includes an annular groove 164 formed between the annular collar 163 and an annular surface 165 of the insert 160 configured to abut the sealing structure 10. The addition of the collar 163 may result in the insert 160 including a shoulder 167 extending radially outwardly relative to a central axis of the insert 160 a greater distance than the shoulder 73 of the insert 60 extends radially outwardly relative to a central axis of the insert 60.

The second block 140 is modified from the configuration of the second block 40 to account for reception of the modified insert 160. The second block 140 includes a flanged portion 142 including a seating surface 144 surrounding a cylindrical aperture 146. The seating surface 144 is configured to abut the shoulder 167 of the insert 160 and the aperture 146 is configured to receive a remainder of the insert 160 extending axially beyond the shoulder 167.

The inclusion of the collar 163 on the insert 160 beneficially spaces the annular surface 165 configured to engage the seal structure 10 from a distal end of the collar 163. The spacing of the annular surface 165 protects the annular surface 165 from potential damage or contamination that may occur during handling or manipulation of the insert 160, wherein such damage or contamination may promote the formation of a flow channel extending beyond the seal structure 10. The seal fitting assembly 105 otherwise operates in the same manner as the seal fitting assembly 5.

Figure 12:
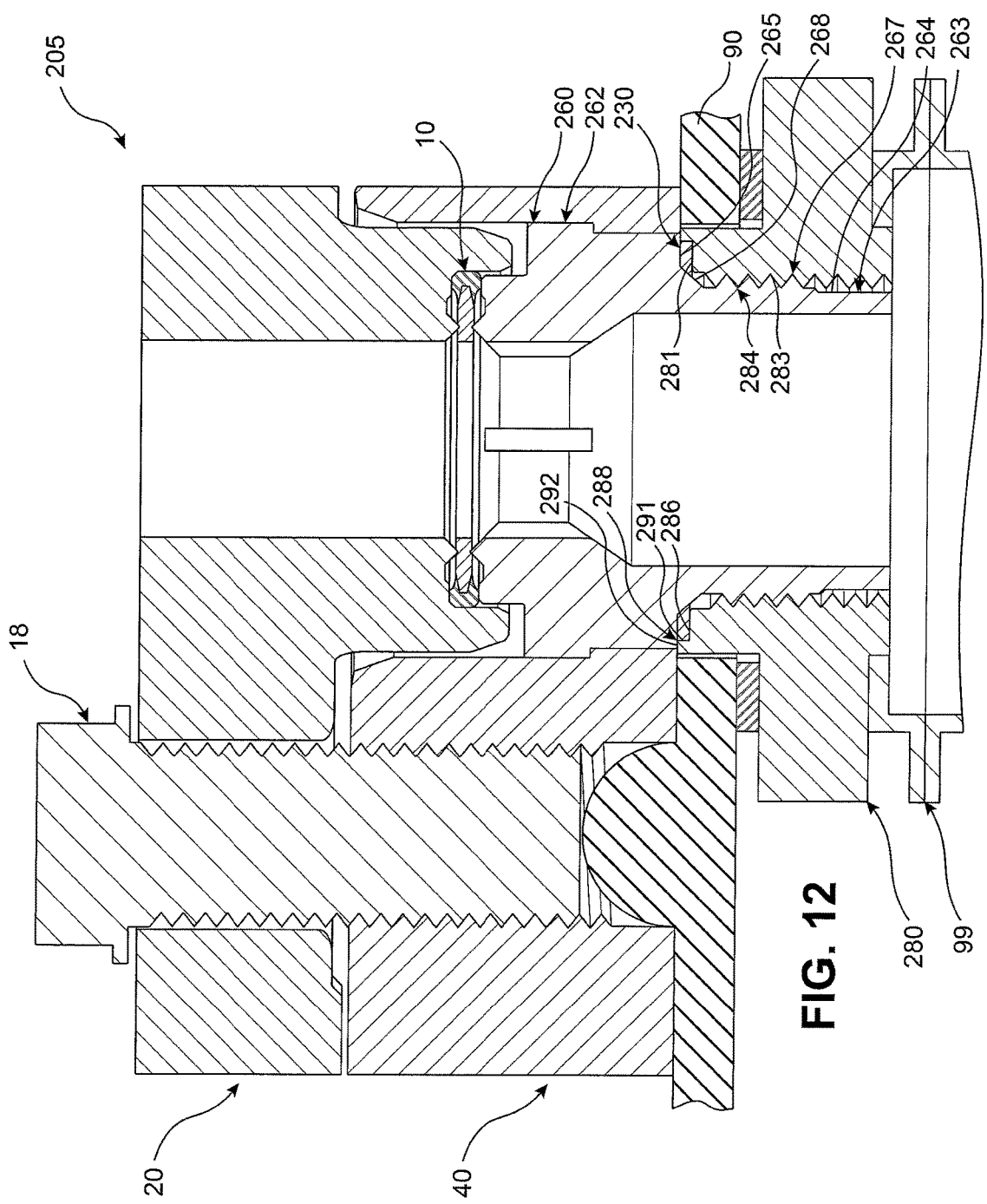
FIG. 12 is a fragmentary cross-sectional elevational view of a seal fitting assembly according to another embodiment of the invention.
Figure 13:
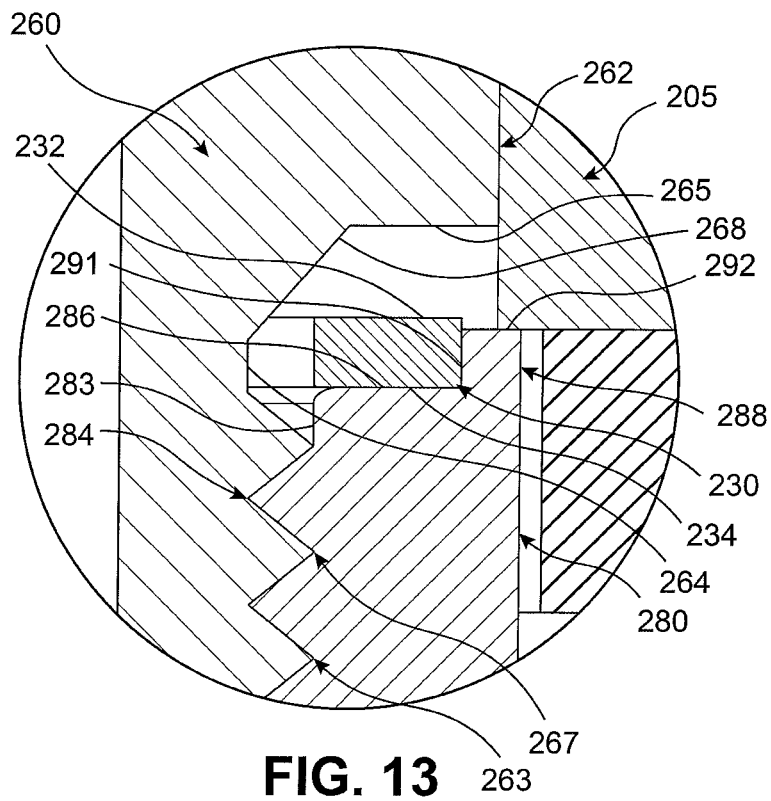
FIG. 13 is an enlarged fragmentary cross-sectional view of the seal fitting assembly of FIG. 12 when in a first configuration.
Figure 14:
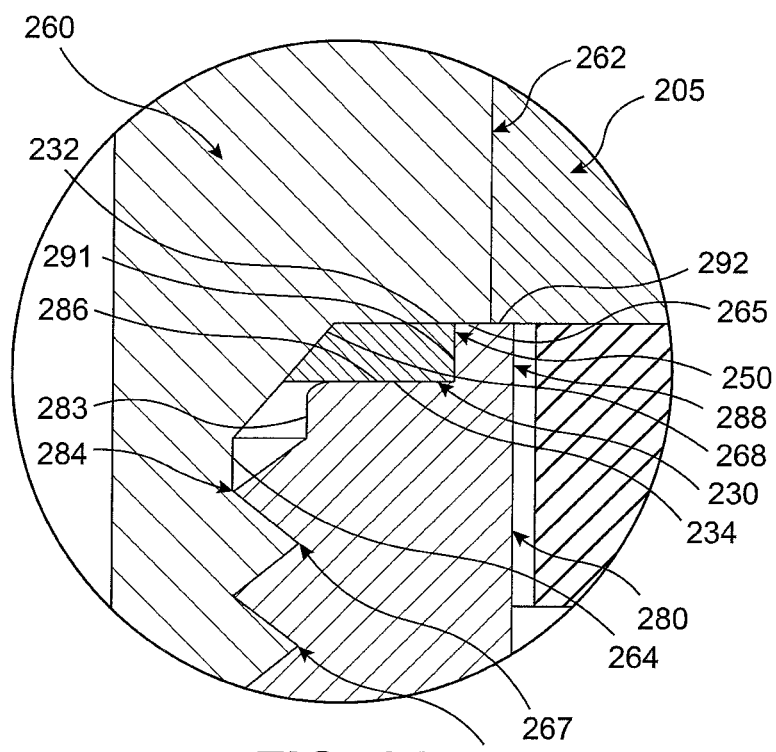
FIG. 14 is an enlarged fragmentary cross-sectional view of the seal fitting assembly of FIG. 12 when in a second configuration.

Referring now to FIGS. 12-14, a seal fitting assembly 205 according to another embodiment of the invention is disclosed. The seal fitting assembly 205 includes an insert 260 and an adapter 280 modified in comparison to the insert 60 and the adapter 80 of the seal fitting assembly 5 disclosed in FIGS. 2-4, but the remainder of the seal fitting assembly 105 including the fastener 18, the first block 20, the second block 40, and the housing wall 90 remain unchanged and operate in the same manner as disclosed hereinabove.

The insert 260 is substantially identical to the insert 60 and includes a larger diameter portion 262 and a smaller diameter portion 263. The smaller diameter portion 263 includes an axially extending surface 264 and the larger diameter portion 262 includes a radially extending surface 265. The axially extending surface 264 of the smaller diameter portion 263 includes a threaded portion 267 spaced from the radially extending surface 265 of the larger diameter portion 262. The insert 260 differs from the insert 60 due to the inclusion of a conical surface 268 arranged transverse to each of the radial direction and the axial direction of the insert 260 connecting the radially extending surface 265 to the axially extending 264.

The adapter 280 is substantially identical to the adapter 80 except for a modification of a first end 281 of the adapter 280 in facing relationship with the insert 260. An aperture 283 extends axially through the adapter 280 and an inner surface of the adapter 280 defining the aperture 283 includes a threaded portion 284 configured to cooperate with the threaded portion 267 of the insert 260. The first end 281 of the adapter 280 includes a radially extending surface 286 extending from an end of the aperture 283 and an annular collar 288 projecting axially from a perimeter of the radially extending surface 286. The annular collar 288 may have a substantially rectangular cross-sectional shape and may include an axially extending surface 291 and a radially extending surface 292. The radially extending surface 292 is configured to abut the larger diameter portion 262 of the insert 260 when the insert 260 is fully inserted relative to the adapter 280.

The seal fitting assembly 205 further includes a seal structure 230 positioned between the insert 260 and the adapter 280 in place of the O-ring 79 of the seal fitting assembly 5. The seal structure 230 is annular and includes a substantially rectangular cross-sectional shape. A first surface 232 of the seal structure 230 is configured to abut the radially extending surface 265 of the insert 260 while an oppositely arranged second surface 234 thereof is configured to abut the radially extending surface 286 of the adapter 280. The seal structure 230 may have a thickness extending in the axial direction of each of the insert 260 and the adapter 280 that is equal to or greater than a distance formed between the radially extending surface 265 of the insert 260 and the radially extending surface 286 of the adapter 280 when the collar 288 of the adapter 280 is in abutment with the radially extending surface 265 of the insert 260. The initial thickness of the seal structure 230 is best shown in FIG. 13, which illustrates an enlarged view of the insert 260, the seal structure 230, and the adapter 280 prior to the radially extending surface 265 of the insert 260 abutting the collar 288 of the adapter 280 during a threading of the insert 260 into the adapter 280.

In the embodiment shown, the seal structure 230 is produced from a tin-coated copper that has been annealed in a non-hydrogen containing inert gas prior to plating with tin in order to avoid embrittlement. However, it is understood that other conventional materials can be used as desired such as laminated tetrafluoroethylene, rubber-coated aluminum, PEEK, Vespel® high performance polyimide polymer, pewter, babbit, bronze, nickel, polyamide, aluminum, and other metal coated or rubber-coated metals, for example. In a particular embodiment, the seal structure 230 is formed from a soft deformable material having a hardness of less than about 40 HR 15T, where "H" stands for hardness, and "R" stands for the Rockwell Hardness and Rockwell Superficial Hardness Test Methods for Metallic Materials as specified in ASTM E 18. The hardness designation code "15T" is a superficial hardness scale which uses a 15 kg load and a ⅟₁₆" diameter hardened steel ball for indentation of a test sample. Typical washer materials such as hardened steel and hardened aluminum have hardness values greater than 40 HR15T, and are therefore not considered in the art to be "soft" materials. One of ordinary skill in the art should understand that materials having a hardness greater than 40 HR15T are not suitable for use in the seal structure 230 of the invention, which is instead configured to be plastically deformed upon installation of the seal structure 230 under a force, for example, from about 500 lbf/inch to about 1000 lbf/inch of sealing bead circumference, which is applied to sealingly engage the seal structure 230.

Referring now to FIG. 14, the insert 260 has been fully threaded into the adapter 280 wherein the radially extending surface 265 of the insert 260 abuts the collar 288 of the adapter 280. When in this position, the seal structure 230 is compressed between the insert 260 and the adapter 280 and the conical surface 268 of the insert 260 applies a force to the seal structure 230 in each of the radial and the axial direction. The relative softness and deformability of the seal structure 230 allows for the seal structure 230 to deform until the seal structure 230 substantially fills a seal gland 250 formed by the cooperation of the insert 260 and the adapter 280. More specifically, the seal gland 250 is defined by the cooperation of the radially extending surface 265, the conical surface 268, and the axially extending surface 264 of the insert 260 in conjunction with the axially extending surface 291 and the radially extending surface 286 of the adapter 280. A cross-sectional area of the seal gland 250 following the complete insertion of the insert 260 into the adapter 280 may be substantially equal to a cross-sectional area of the seal structure 230 prior to deformation thereof. As such, the substantially rectangular cross-sectional shape of the seal structure 230 deforms to substantially fill the entirety of the irregularly shaped seal gland 250 to hydrostatically lock the seal structure 230 within the seal gland 250. The seal gland 250 further prevents additional motion of the seal structure 230 following complete insertion of the insert 260 into the adapter 280 by substantially surrounding and restricting motion of the seal structure 230 in both the axial and the radial directions of the insert 260 and the adapter 280.

The hydrostatic locking of the seal structure 230 within the seal gland 250 prevents the seal structure 230 from undesirably undergoing continued deformation in the form of creep that could otherwise deteriorate the effectiveness of the seal fitting assembly 205 following an extended period of use thereof. Additionally, the compressive forces acting on the seal structure 230 further promote a flow of the material forming the seal structure 230 into any irregularities or surface defects present in either of the insert 260 or the adapter 280 to prevent the formation of any flow channels between the seal structure 230 and either of the insert 260 and the adapter 280 that could compromise the seal formed therebetween. Lastly, the compressive forces applied to the seal structure 230 further prevent the rotation of the insert 260 relative to the adapter 280, thereby preventing undesired rotation of the seal fitting assembly 205 relative to the housing wall 90.

Figure 15:
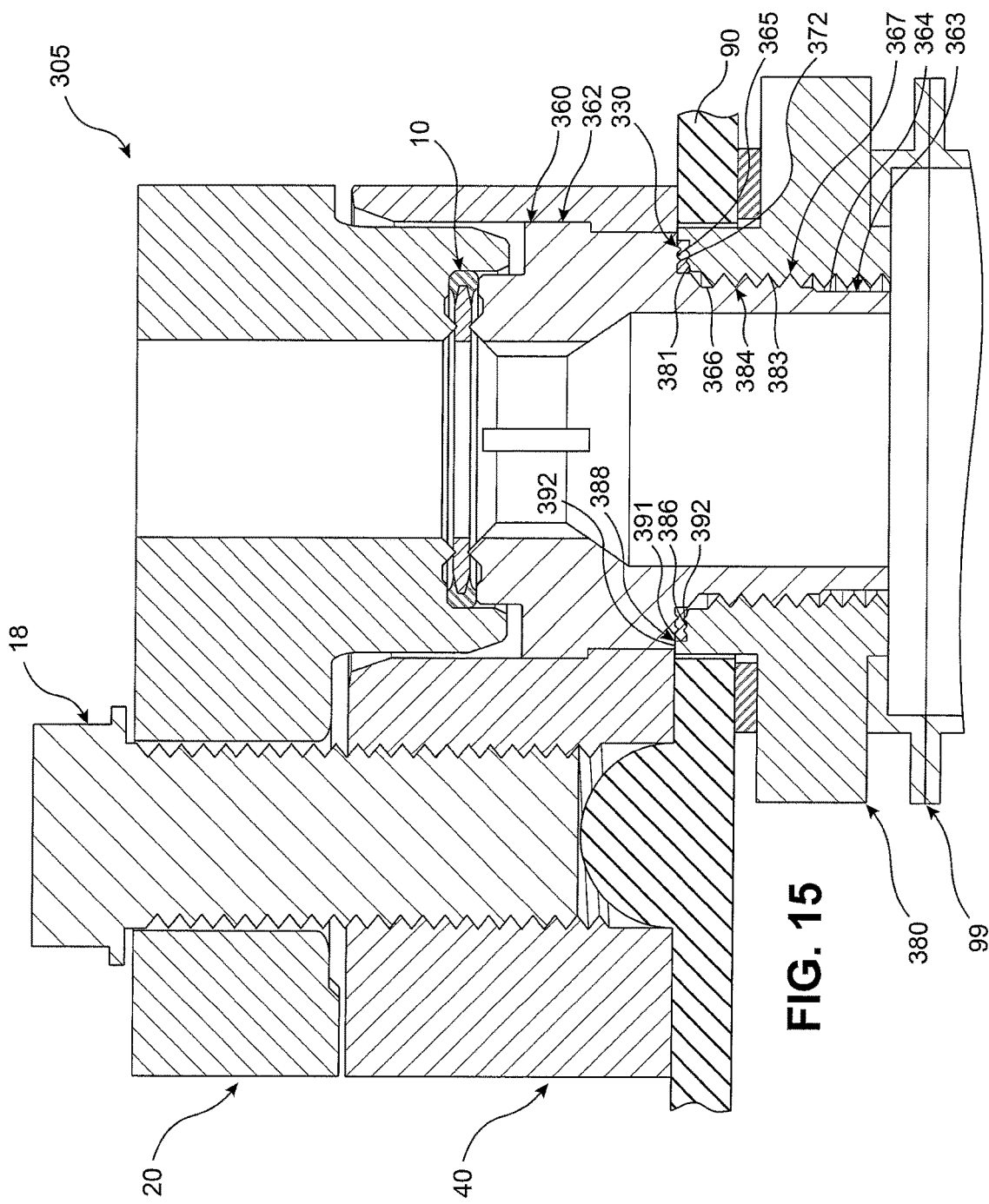
FIG. 15 is a fragmentary cross-sectional elevational view of a seal fitting assembly according to another embodiment of the invention.
Figure 16:
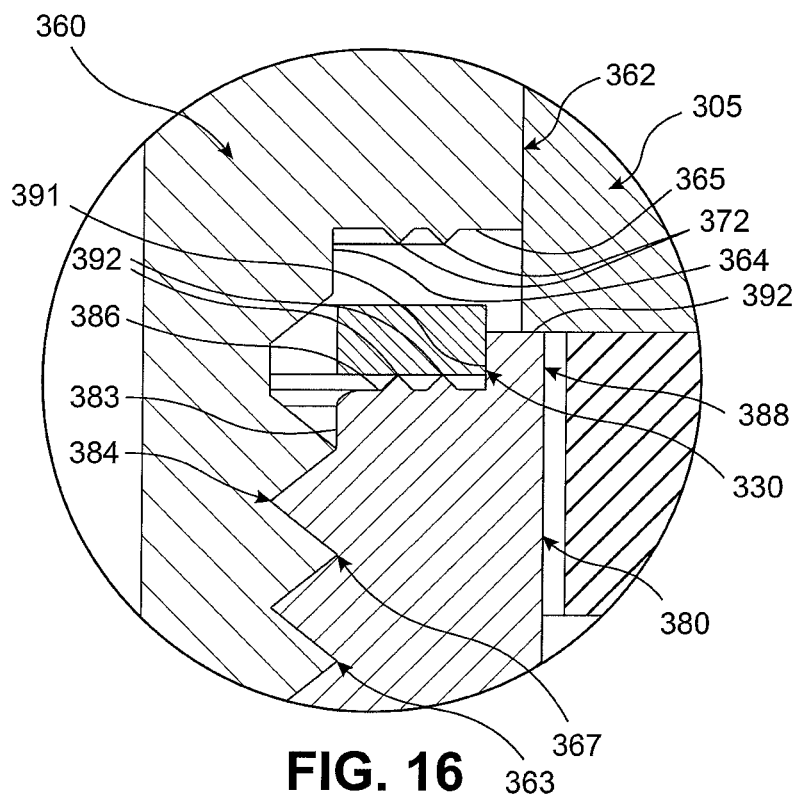
FIG. 16 is an enlarged fragmentary cross-sectional view of the seal fitting assembly of FIG. 15 when in a first configuration.
Figure 17:
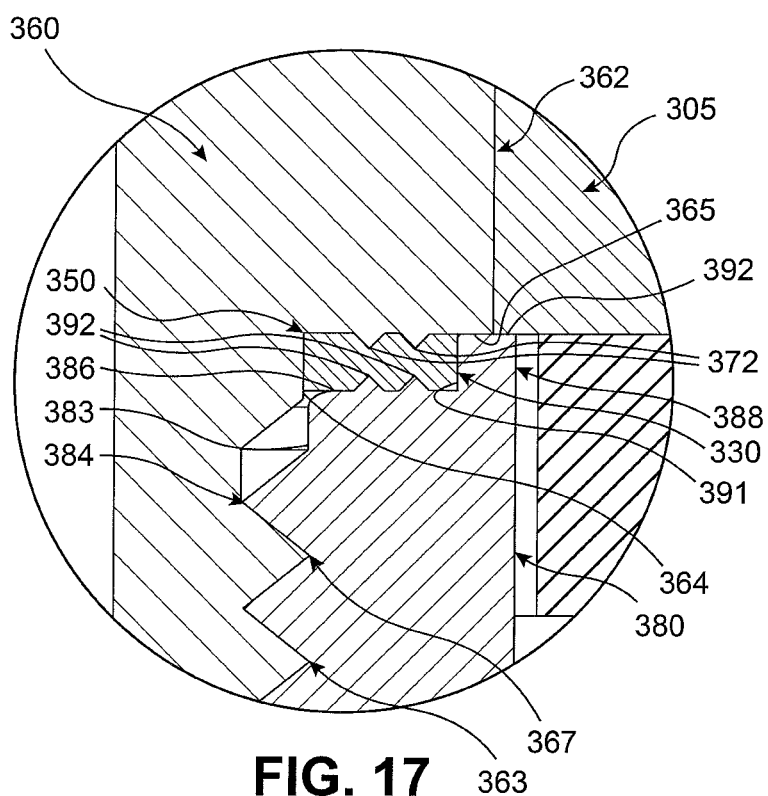
FIG. 17 is an enlarged fragmentary cross-sectional view of the seal fitting assembly of FIG. 15 when in a second configuration.

Referring now to FIGS. 15-17, a sealing assembly 305 according to another embodiment of the invention is disclosed. The seal fitting assembly 305 is substantially similar to the seal fitting assembly 5 and includes the fastener 18, the first block 20, the second block 40, and the housing wall 90 as described hereinabove. The seal fitting assembly 305 includes a modified insert 360 and adapter 380 used to compress a sealing structure 330 therebetween.

The insert 360 is substantially similar to the insert 60 and includes a larger diameter portion 362 and a smaller diameter portion 363. The smaller diameter portion 363 includes an axially extending surface 364 and the larger diameter portion 362 includes a radially extending surface 365. The axially extending surface 364 of the smaller diameter portion 363 includes a threaded portion 367 spaced from the radially extending surface 365 of the larger diameter portion 362. The insert 360 further includes a pair of annular sealing beads 372 projecting axially from the radially extending surface 365.

The adapter 380 is substantially similar to the adapter 280 and includes an aperture 383 extending axially therethrough with a threaded portion 384 configured to cooperate with the threaded portion 367 of the insert 360. A first end 381 of the adapter 380 includes a radially extending surface 386 extending from an end of the aperture 383 and an annular collar 388 projecting axially from a perimeter of the radially extending surface 386. The annular collar 388 may have a substantially rectangular cross-sectional shape and may include an axially extending surface 391 and a radially extending surface 392. The radially extending surface 392 is configured to abut the larger diameter portion 362 of the insert 360 when the insert 360 is fully inserted relative to the adapter 380. The adapter 380 further includes a pair of annular sealing beads 392 projecting axially from the radially extending surface 386 and in alignment with the pair of the sealing beads 372 of the adapter 360.

Each of the sealing beads 372, 392 of either of the insert 360 or the adapter 380 may have one of the cross-sectional shapes shown in FIGS. 5-10 with reference to the sealing beads 38, 78. In particularly illustrative embodiments, the sealing beads 372, 392 each include a tip that is substantially V-shaped with a sharp angle. The sealing beads 372, 392 may be formed sufficiently sharp so as to cut through contamination such as oil, dirt, hair, and other debris that may undesirably be present on a surface of the seal structure 330.

The sealing structure 330 is identical to the sealing structure 230 disclosed hereinabove with reference to the sealing assembly 205 and may include an initial thickness greater than a height of the annular collar 388 relative to the radially extending surface 386. The initial thickness of the seal structure 330 is best shown in FIG. 16, which illustrates an enlarged view of the insert 360, the seal structure 330, and the adapter 380 prior to the radially extending surface 365 of the insert 360 abutting the collar 388 of the adapter 380 during a threading of the insert 360 into the adapter 380.

Referring now to FIG. 17, the insert 360 has been fully threaded into the adapter 380 wherein the radially extending surface 365 of the insert 360 abuts the collar 388 of the adapter 380. When in this position, the seal structure 330 is compressed between the insert 360 and the adapter 380. The relative softness and deformability of the seal structure 330 allows for the seal structure 330 to deform until the seal structure 330 substantially fills a seal gland 350 defined by the cooperation of the radially extending surface 365 and the axially extending surface 364 of the insert in conjunction with the axially extending surface 391 and the radially extending surface 386 of the adapter 380. A cross-sectional area of the seal gland 350 following the complete insertion of the insert 360 into the adapter 380 may be substantially equal to a cross-sectional area of the seal structure 330 prior to deformation thereof. As such, the substantially rectangular cross-sectional shape of the seal structure 330 deforms to substantially fill the entirety of the seal gland 350 to hydrostatically lock the seal structure 330 within the seal gland 350. The seal gland 350 further prevents additional motion of the seal structure 330 following complete insertion of the insert 360 into the adapter 380 by substantially surrounding and restricting motion of the seal structure 330 in both the axial and the radial directions of the insert 360 and the adapter 380.

The hydrostatic locking of the seal structure 330 within the seal gland 350 prevents the seal structure 330 from undesirably undergoing continued deformation in the form of creep that could otherwise deteriorate the effectiveness of the seal fitting assembly 305 following an extended period of use thereof. Additionally, the compressive forces acting on the seal structure 330 further promote a flow of the material forming the seal structure 330 into any irregularities or surface defects present in either of the insert 360 or the adapter 380 to prevent the formation of any flow channels between the seal structure 330 and either of the insert 360 and the adapter 380 that could compromise the seal formed therebetween. Lastly, the compressive forces applied to the seal structure 330 and the impingement of the sealing beads 372, 392 therein further prevents the rotation of the insert 360 relative to the adapter 380, thereby preventing undesired rotation of the seal fitting assembly 305 relative to the housing wall 90.

The seal structures 230, 330 have been described as having a substantially rectangular cross-sectional shape, but it should be understood by one skilled in the art that alternative shapes may be used so long as the resulting seal structure is capable of substantially filling the resulting seal gland formed by the cooperation of the insert and the adapter.

One skilled in the art should further appreciate that each of the seal fitting assemblies 5, 105, 205, 305 shown and described herein may be modified to include the features of the others of the seal fitting assemblies 5, 105, 205, 305 without departing from the scope of the present invention. For example, the axially extending collar 163 of the insert 160 may be adapted for use with either of the inserts 260, 360, as desired.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A seal fitting assembly for a housing wall having an opening formed therein, the seal fitting assembly comprising:
    a first block having a first aperture, a second aperture, and a first annular sealing surface surrounding the first aperture;
    a second block having a third aperture and a fourth aperture, a surface of the second block defining the fourth aperture including a first threaded portion;
    an insert having a fifth aperture, a second annular sealing surface, and a second threaded portion;
    a first seal structure disposed between the first annular sealing surface and the second annular sealing surface configured to be compressed therebetween;
    an adapter having a sixth aperture, a surface of the adapter defining the sixth aperture including a third threaded portion configured to engage the second threaded portion of the insert;

a second seal structure disposed between the insert and the adapter configured to be compressed therebetween; and a fastener received in the second aperture of the first block and the fourth aperture of the second block, the fastener including a fourth threaded portion configured to engage the first threaded portion of the second block.

2. The seal fitting assembly of claim 1, wherein the first annular sealing surface includes a first sealing bead and the second annular sealing surface includes a second sealing bead, the first sealing bead and the second sealing bead configured to impinge the first seal structure.

3. The seal fitting assembly of claim 1, wherein the insert includes at least one axially extending slot extending from the second annular sealing surface, the at least one axially extending slot configured to engage a tool for rotating the insert relative to the adapter.

4. The seal fitting assembly of claim 1, wherein the insert includes an annular collar extending beyond the second sealing surface thereof in an axial direction of the insert extending from the second threaded portion toward the second annular sealing surface, the annular collar configured to receive the first annular sealing surface of the first block therein.

5. The seal fitting assembly of claim 1, wherein one of the first block or the second block includes a leverage feature projecting therefrom in direction toward the other of the first block or the second block.

6. The seal fitting assembly of claim 1, wherein the first seal structure includes a first portion formed from a plastically deformable metal and a second portion formed from an elastomeric material.

7. The seal fitting assembly of claim 1, wherein the fourth aperture of the second block is configured to receive a locating feature formed on the housing wall for fixing a rotational position of the second block relative to the housing wall.

8. The seal fitting assembly of claim 1, wherein the adapter is mechanically coupled to an internal heat exchanger housing disposed to a side of the housing wall opposite the first block and the second block, the internal heat exchanger housing in fluid communication with the first aperture of the first block and the fifth aperture of the insert.

9. The seal fitting assembly of claim 1, wherein the first block forms a male component and the second block and the insert cooperate to form a female component configured to receive the male component.

10. The seal fitting assembly of claim 1, wherein the second seal structure is formed from a plastically deformable metal.

11. The seal fitting assembly of claim 10, wherein the insert and the adapter cooperate to define a seal gland when a radially extending surface of the adapter abuts an end of the adapter, wherein a cross-sectional area of the seal gland is substantially equal to a cross-sectional area of the second seal structure prior to compression between the insert and the adapter.

12. The seal fitting assembly of claim 11, wherein the second seal structure plastically deforms to substantially fill the seal gland during the compression of the second seal structure between the insert and the adapter.

13. The seal fitting assembly of claim 12, wherein the seal gland restricts movement of the second seal structure in each of the axial and the radial directions of the insert to minimize additional deformation of the second seal structure during use of the seal fitting assembly.

14. The seal fitting assembly of claim 11, wherein each of a surface of the insert defining a first portion of the seal gland and a surface of the adapter defining a second portion of the seal gland includes a sealing bead configured to impinge the second seal structure during compression between the insert and the adapter.

15. The seal fitting assembly of claim 10, wherein the plastically deformable metal has a hardness of less than 40 HR 15T.

16. The seal fitting assembly of claim 1, wherein the insert includes a larger diameter portion including the second annular sealing surface and a smaller diameter portion including the second threaded portion.

17. The seal fitting assembly of claim 16, wherein the larger diameter portion of the insert includes a first shoulder configured to engage a second shoulder formed on the surface of the second block defining the fourth aperture.

18. The seal fitting assembly of claim 16, wherein the larger diameter portion of the insert includes a first radially extending surface having a first sealing bead and the adapter includes a second radially extending surface having a second sealing bead in facing relationship with the first sealing bead.

19. A heat exchanger assembly comprising:
a heat exchanger tank configured to receive a first fluid and including an outer housing wall having an opening formed therein and a locating feature projecting therefrom;
an internal heat exchanger housing disposed within the heat exchanger tank and configured to receive a second fluid fluidly isolated from the first fluid; and
a seal fitting assembly comprising:
a first block having a first aperture, a second aperture, and a first annular sealing surface surrounding the first aperture;
a second block having a third aperture and a fourth aperture, a surface of the second block defining the fourth aperture including a first threaded portion, the fourth aperture configured to receive the locating feature of the housing wall therein;
an insert having a fifth aperture, a second annular sealing surface, and a second threaded portion;
a first seal structure disposed between the first annular sealing surface and the second annular sealing surface configured to be compressed therebetween;
an adapter mechanically coupled to the internal heat exchanger housing and having a sixth aperture, a surface of the adapter defining the sixth aperture including a third threaded portion configured to engage the second threaded portion of the insert;
a second seal structure disposed between the insert and the adapter configured to be compressed therebetween; and
a fastener received in the second aperture of the first block and the fourth aperture of the second block, the fastener including a fourth threaded portion configured to engage the first threaded portion of the second block.

20. The heat exchanger assembly of claim 19, wherein the first seal structure and the second seal structure are formed from a plastically deformable metal.

* * * * *